United States Patent
Ajmera et al.

(10) Patent No.: US 9,065,756 B2
(45) Date of Patent: Jun. 23, 2015

(54) SYSTEM AND METHOD FOR PROVIDING FAST AND EFFICIENT FLUSHING OF A FORWARDING DATABASE IN A NETWORK PROCESSOR

(71) Applicant: Intel Corporation, Santa Clara, CA (US)

(72) Inventors: Vishal D. Ajmera, Bangalore (IN); Santosh Narayanan, Bangalore (IN); Benzeer B. Pazhayakath, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 13/737,163

(22) Filed: Jan. 9, 2013

(65) Prior Publication Data

US 2014/0192633 A1 Jul. 10, 2014

(51) Int. Cl.
*H04L 12/707* (2013.01)
*H04L 12/751* (2013.01)
*H04L 12/703* (2013.01)

(52) U.S. Cl.
CPC .................. *H04L 45/22* (2013.01); *H04L 45/02* (2013.01); *H04L 45/28* (2013.01)

(58) Field of Classification Search
None
See application file for complete search history.

(56) References Cited

U.S. PATENT DOCUMENTS

| 6,766,482 | B1 * | 7/2004 | Yip et al. | 714/717 |
| 7,003,705 | B1 * | 2/2006 | Yip et al. | 714/717 |
| 7,342,874 | B2 * | 3/2008 | Pegrum et al. | 370/218 |
| 2009/0252030 | A1 * | 10/2009 | Kashyap et al. | 370/216 |
| 2012/0300617 | A1 * | 11/2012 | Ao | 370/218 |
| 2013/0088976 | A1 * | 4/2013 | Ao et al. | 370/242 |
| 2014/0016649 | A1 * | 1/2014 | Sinha | 370/401 |

OTHER PUBLICATIONS

Kwang-Koog Lee and Jeong-Dong Ryoo; Flush Optimizations to Guarantee Less Transient Traffic in Ethernet Ring Protection; ETRI Journal; Apr. 2010; vol. 32, No. 2; pp. 184-194.

* cited by examiner

*Primary Examiner* — Dang Ton
*Assistant Examiner* — Ronald H David
(74) *Attorney, Agent, or Firm* — Douglas A. Dallmann

(57) ABSTRACT

Aspects of the disclosure pertain to a system and method for providing fast and efficient flushing of a forwarding database in a network processor. The present disclosure provides a deterministic mechanism to implement a flush operation for flushing the forwarding database. A dual FDB approach, a means for switching from one FDB to another in the event of a failure, and FDB flush operation as a background task are key features of this disclosure. The effective time for completing the flush operation is within a sub-50 millisecond time frame and is independent of the number of entries in the forwarding database. The flush operation may be performed using software.

18 Claims, 2 Drawing Sheets

SYSTEM AND METHOD FOR PROVIDING FAST AND EFFICIENT FLUSHING OF A FORWARDING DATABASE IN A NETWORK PROCESSOR

FIELD OF THE INVENTION

The present disclosure relates to the field of electronic data handling and particularly to a system and method for providing fast and efficient flushing of a forwarding database in a network processor.

BACKGROUND

Network processors are integrated circuits which have feature sets specifically targeted at the networking application domain. Network processors are sometimes used in network configurations implemented within nodes of a ring topology, to ensure resiliency and protection against failures. However, there are certain stringent performance constraints that network processors implemented within nodes of a ring topology have to comply to, in order to be an acceptable solution.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner Aspects of the disclosure pertain to a system and method for providing fast and efficient flushing of a forwarding database in a network processor.

DESCRIPTION OF THE FIGURES

The detailed description is described with reference to the accompanying figures.

WRITTEN DESCRIPTION

Figure 1:
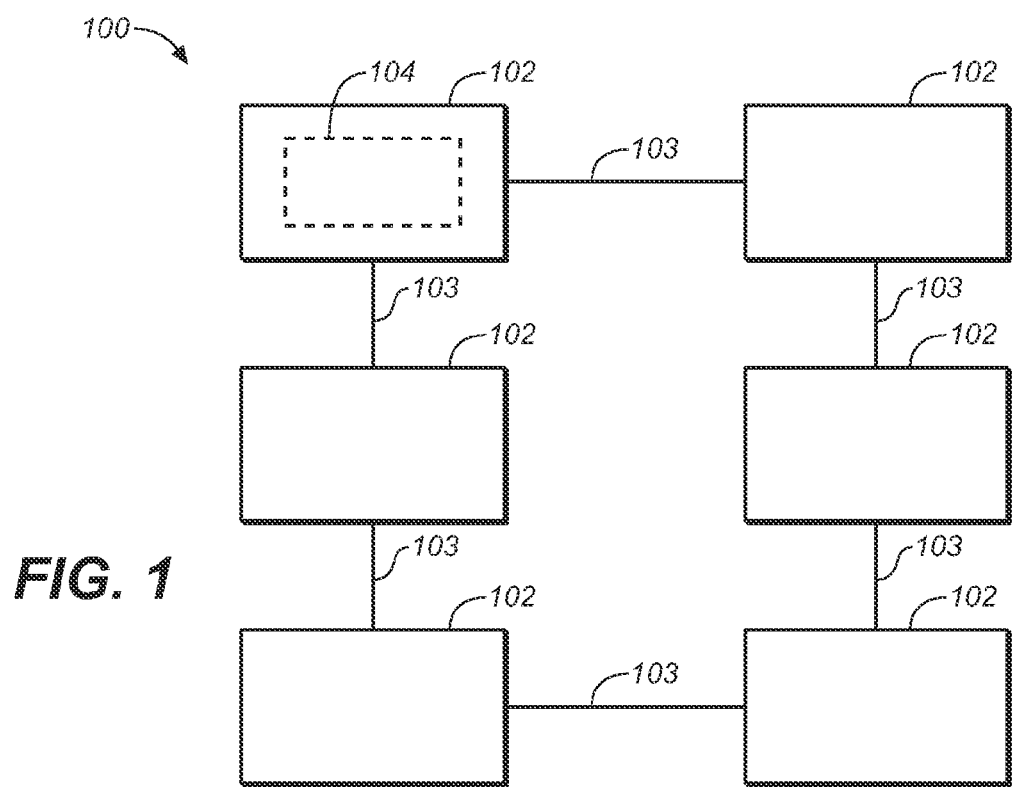
FIG. 1 is an example conceptual block diagram schematic of a ring topology of nodes.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

Ethernet Ring Protection Switching (ERPS) is an effort at International Telecommunication Union Telecommunication Standardization Sector (ITU-T) under G.8032 Recommendation to provide sub-fifty millisecond (sub-50 ms) protection and recovery switching for Ethernet-based nodes (e.g., switches) and Ethernet traffic in a ring topology and at the same time ensuring that there are no loops formed at the Ethernet layer. G.8032v1 supported a single ring topology and G.8032v2 supports multiple rings/laddertopologies. ERPS specifies protection switching mechanisms and a protocol for Ethernet layer network (ETH) rings. Ethernet rings can provide wide-area multipoint connectivity more economically due to their reduced number of links. The mechanisms and protocol defined in this Recommendation achieve highly reliable and stable protection, and never form loops, which would fatally affect network operation and service availability.

In ERPS, each Ethernet ring node is connected to adjacent Ethernet ring nodes participating in the same Ethernet ring, using two independent links. A ring link is bounded by two adjacent Ethernet ring nodes, a port for a ring link is called a ring port. The minimum number of Ethernet ring nodes in an Ethernet ring is three. The fundamentals of this ring protection switching architecture are: a) the principle of loop avoidance; and b) the utilization of learning, forwarding and filtering database (FDB) mechanisms defined in the Ethernet flow forwarding function (ETH_FF). Loop avoidance in an Ethernet ring is achieved by guaranteeing that, at any time, traffic may flow on all but one of the ring links. This particular link is called the Ring Protection Link (RPL), and under normal conditions (e.g., during the normal state), this ring link is blocked (i.e., not used for service traffic). One designated Ethernet ring node, the RPL Owner Node, is responsible for blocking traffic at one end of the RPL. Under an Ethernet ring failure condition, the RPL Owner Node is responsible for unblocking its end of the RPL (unless the RPL has failed), thereby allowing the RPL to be used for traffic. The other Ethernet ring node adjacent to the RPL is called the RPL Neighbor Node, which may also participate in blocking or unblocking its end of the RPL. The event of an Ethernet ring failure results in protection switching of the traffic. This is achieved under the control of the ETH_FF functions on all Ethernet ring nodes. An Automatic Protection Switching (APS) protocol is used to coordinate the protection actions over the ring.

In Ethernet-based switching implementations, such as ERPS (discussed above), there are several situations in which the forwarding database (FDB) needs to be flushed partially or wholly. Often, it is required to perform this flushing operation as quickly as possible to allow for re-learning of the FDB. For example, in ERPS, it may be required to complete the flushing (e.g., unlearning) of all forwarding databases (FDBs) (e.g., learning and forwarding tables in the data plane, Media Access Control (MAC) learning tables, MAC forwarding tables) within a sub-50 ms time frame. During this process, no new MACs (e.g., MAC learning tables, MAC forwarding tables, MAC addresses) are learned until the system completes switching to the RPL.

ERPS defines a protection domain which includes one or more Virtual Local Area Networks (VLANs) to be protected from failure. As mentioned above, ERPS operates on a ring topology of Ethernet based devices (e.g., switches). In the normal mode of operation, packet forwarding takes place in the direction towards the RPL node (e.g., RPL Owner Node). When a link failure happens, the ERPS mechanism detects the same and initiates the selection of an alternate path through the ring. This reversal of packet forwarding direction requires the flushing and re-learning of the FDBs. This flushing is needed for all the MACs learned in all the VLANs that are part of the protection domain.

Figure 2:
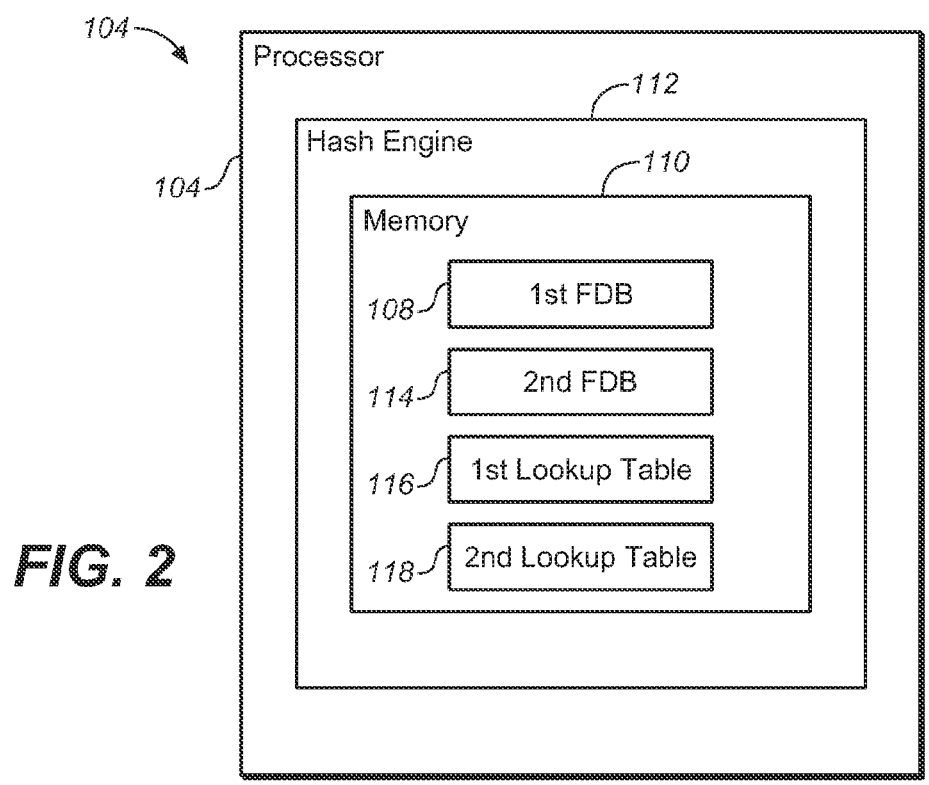
FIG. 2 is an example conceptual block diagram schematic of a processor (e.g., network processor) implemented within one of the nodes of the ring topology shown in FIG. 1.

Referring to FIG. 1 (FIG. 1), a ring topology 100 of devices (e.g., nodes) 102 is shown. For example, the devices 102 may be switches, routers, or the like, which are connected to each other via a data links (e.g., communication links) 103 to form the ring topology. In embodiments, the devices 102 are Ethernet-based devices. In embodiments, the ring topology 100 is configured for implementing ERPS (e.g., ERPS operates on the ring topology). For instance, the devices 102 of the ring topology 100 are G.0832 compliant. In embodiments, each device (e.g., switch) 102 includes (e.g., is based upon) a processor 104, such as a network processor or a communications processor (as shown in FIG. 2 (FIG. 2)). In embodiments, the processor 104 is G.8032 compliant. In embodiments, the processor 104 (e.g., network processor) is an integrated circuit which has a feature set specifically targeted at the networking application domain. In embodiments, the processor 104 (e.g., network processor) is a software-programmable device configured for processing packet data. In embodiments, the processor 104 (e.g., network processor) is configured for performing one or more of the following functions: pattern matching; key lookup; computation; data bitfield manipulation; queue management; control processing; traffic management and quick allocation/re-circulation of packet buffers. In embodiments, a software program running on the network processor 104 may implement an application that the network processor 104 executes, resulting in the device 102 performing a task or providing a service. For example, some of the application types may include: packet or frame discrimination and forwarding; Quality of Service (QoS) enforcement; access control functions; encryption; and Transmission Control Protocol (TCP) offload processing.

In embodiments, the processor 104 (e.g., network processor) is configured for providing wire-speed processing (e.g., learning) and forwarding of packets in a data plane of the processor. In embodiments, a forwarding database (FDB) 108 (e.g., FDB table) is maintained in a memory (e.g., hash engine memory) 110 of the processor 104. In embodiments, each entry in the FDB 108 can age-out on its own (e.g., without control plane intervention) when an aging timer expires. In embodiments, the processor 104 is configured for supporting wire-speed processing (e.g., learning) of Media Access Control (MAC) addresses in the data plane without any intervention of the control plane. The processor 104 achieves this by utilizing a hardware-based hash engine 112. In embodiments, the FDB 108 (e.g., learning tables) are maintained in the hash engine 112 (e.g., hash engine memory 110) are updated using data plane packet processing software.

In embodiments, when a new MAC address is received (e.g., detected) by the processor 104, a new entry is created in the FDB 108 (e.g., learning table(s)) and an associated aging timer is started, the new entry automatically aging out when the timer expires. In embodiments, if a packet having a known MAC address was received by the processor 104, this would cause the aging timer to be reset. In embodiments, when the aging timer expires, the entry (e.g., MAC address) is removed from the learning table. In embodiments, all of these operations are supported in the data plane of the network processor 104 at wire-speed. In embodiments, MAC learning (e.g., processing) and forwarding (e.g., MAC address learning and forwarding) are performed by the processor 104 in the context of Virtual Local Area Networks (VLANs). In embodiments, for every entry addition in the FDB 108, the processor 104 is configured for sending a notification to the control plane to ensure that the FDB 108 seen by the operator is in sync with what is available in the data plane.

In embodiments, the FDB 108 of the processor 104 includes learning and forwarding tables (e.g., MAC learning and forwarding tables) which are maintained in the data plane. In embodiments, in order to facilitate wire speed switching, operations of the forwarding database (FDB) 108 of the processor 104, such as processing (e.g., learning), aging and flushing are managed in the data plane. In embodiments, the control plane is only notified by the processor 104 of any changes in the FDB 108, so as to keep the operator's view of the FDB 108 in sync with the data plane. In embodiments, the processor 104 implements a hash table-based design for the FDB 108. In embodiments, a hardware-based operation for flushing the FDB 108 (e.g., tables) of the memory 110 (e.g., memory of the hash engine 112) is not supported by the processor 104, therefore requiring each entry (e.g., MAC address) to be removed from the tables 108 individually. This results in a long flush time of the tables 108 and prevents a network implementer from having a deterministic time guarantee on the flush timing, since flush time increases linearly as the number of entries in the FDB 108 grows. This introduces a scalability issue as the compliance to sub-50 millisecond switchover depends on the time needed for FDB flush. Also, this individual removal of entries from the table(s) 108, requires the control plane to keep track of all the MACs (e.g., MAC addresses, entries) which are learned in the data plane in order to remove them when flush is needed. In embodiments, a mechanism implemented by the processor 104 for flushing the FDB 108 involves a sequence of operations. For example, a first step in the sequence of operations can include generating a task for the deletion of each hash table entry of the learning and forwarding table(s) 108 (e.g., MAC learning and forwarding table(s)). In embodiments, each task deletes the entry and notifies the control plane of a successful removal. For instance, if there are a number "N" of VLANs and each of the VLANs has, on average, a number "M" of MAC entries, then the total number of FDB entries to be removed=N*M (N multiplied by M). In embodiments, the time needed for flushing operation increases with the product of N and M (e.g., N is a usually a small number, M is usually a large number). In embodiments, since flushing is one operation in a sequence of operations that needs to be completed within 50 ms, the current mechanism is not a deterministic mechanism that can guarantee the same.

As will be discussed in detail below, the present disclosure describes a deterministic mechanism to implement a flush operation for flushing the FDB 108 maintained in the data plane of the network processor 104, the effective time for completing the flush operation being independent of the number of entries in the FDB 108. With no direct support in hardware for performing the flush operation, an innovative method is devised, as discussed below, for performing such flush operation using software. Also, as will be discussed in detail below, the present disclosure further provides a scalable solution for FDB flush operations which allow for the flush operations to be performed within a sub-50 ms time frame irrespective of the number of entries in the FDB table.

In embodiments, the processor 104 further includes a second FDB 114. In embodiments, the second FDB 114 is maintained in the memory 110 of the processor 104. As mentioned above, in embodiments, the processor 104 is configured for implementing ERPS. As discussed above, during the normal state, the working link is active and the RPL link is blocked. However, in the event of a link failure or forced switch, protection switching (ERPS) may be triggered. As discussed above, during the ERPS process, the RPL link is unblocked and R_APS message propagation occurs within the ring topology 100 so that all nodes 102 are notified of the failure. In embodiments, when protection switching (e.g., ERPS) is triggered, and it is determined that FDB flushing is needed, the processor 104 is configured for: a.) disconnecting (e.g., cutting-off) the first FDB 108 (e.g., the FDB associated with the failed link/working link) from a data path (e.g., packet processing path of the ring topology 100) connected to the processor 104; and b.) connecting the second FDB 114 (e.g., the FDB associated with the protection link) to the data path (e.g., packet processing path) connected to the processor 104.

In embodiments, when the second FDB 114 is connected to the data path during the protection switching (e.g., ERPS) process, the second FDB 114 is implemented by the processor 104 for processing (e.g., learning, tracking) MAC data (e.g., MAC addresses, MAC entries). Further, when the first FDB 108 is disconnected from the data path during the protection switching process, the first FDB 108 is not used for processing (e.g., learning, tracking) MAC data (e.g., MAC addresses, MAC entries). Thus, during protection switching, the second FDB 114 may serve as an independent FDB, which is associated with the protection link.

In embodiments, the processor 104 includes (e.g., is configured for providing) a selector (e.g., a VLAN-based protection domain selector) configured for choosing (e.g., switching) between the FDB associated with the working link (FDB 108) and the FDB associated with the protection link (FDB 114) during protection switching when it is determined that FDB flushing is needed. In embodiments, the processor 104 includes a first lookup table (e.g., a VLAN-based table, a VLAN-level table) 116. In embodiments, the first lookup table 116 is stored in a memory 110 of the processor 104. During protection switching, when it is determined that FDB flushing is needed, the first lookup table 116 is configured for outputting a protection domain. As mentioned above, ERPS defines a protection domain which includes one or more Virtual Local Area Networks (VLANs) to be protected from failure. In embodiments, this information is available upfront. For example, the control plane configures the first lookup table (e.g., the VLAN-level table, the protection domain table) 116 at system (e.g., device 102) bring-up.

In embodiments, the processor 104 includes a second lookup table 118, the second lookup table being configured for receiving the protection domain output as an input (e.g., the protection domain output being provided by the first lookup table 116). In embodiments, the second lookup table 118 is configured for providing an output (e.g., a selector output), the output provided by the second lookup table 118 being based upon the received protection domain output transmitted by the first lookup table 116. In embodiments, the output provided by the second lookup table 118 causes (e.g., effects) selection between the first FDB 108 and the second FDB 114 (e.g., causes selection of either the first FDB 108 or the second FDB 114). In embodiments, the second lookup table 118 is stored in a memory 110 of the processor 104.

In functioning as described above, the lookup tables (116, 118) collectively act as a selector (e.g., switch) for the processor 104, the selector configured for effecting the selection of an alternate FDB (e.g., FDB table) when the protection switching process occurs (e.g., when a link failure occurs) and it is determined that FDB flushing is necessary. Further, the selector is configured for being updated, in the event of protection switching, to select the protection link FDB (e.g., FDB 114) instead of the failed link (e.g., working link) FDB (e.g., FDB 108).

As mentioned above, in embodiments, when protection switching takes place and it is determined that FDB flush is needed, the alternate FDB (FDB 114) is selected for the VLANs in the protection domain. For example, for the VLANs in question, the FDB (e.g., FDB 108) with forwarding entries which existed in the packet processing path before the failover is disconnected from (e.g., detached from) the packet processing path for the processor 104, while the alternate FDB (e.g., FDB 114) appears in (e.g., is connected to) the packet processing path and starts processing (e.g., learning, tracking) MAC data (e.g., MAC addresses, MAC entries). In embodiments, the processing (e.g., learning, tracking) of MAC data performed by the FDB 114 occurs (e.g., starts) with a clean slate for the VLANs in question. The above-referenced approach works fine, since link failovers in any reliable network deployment are bound to happen at a low frequency. In embodiments, there is no FDB switching in cases where FDB flush is not needed, such as working link recovery. In embodiments, the protection domain output may include a flag for indicating whether an FDB flush is needed. For example, when an FDB flush flag is set, FDB switching is done (e.g., complete).

In embodiments, when protection switching takes place (e.g., is triggered) and it is determined that FDB flushing is needed, the processor 104 is configured for allowing flushing of MAC data (e.g., MAC entries, MAC addresses, MACs) from the FDB which has been disconnected from the data path. In embodiments, once the failed link FDB (FDB 108) is disconnected (e.g., cut-off) from the data path (e.g., packet processing path), the MAC entries in the failed link FDB (FDB 108) can be removed from the FDB 108 in either of two ways. In embodiments, a first way involves initiating a control plane-based flushing (e.g., removal, unlearning) of the MAC entries. In embodiments, a second way involves automatic removal of the entries due to expiration of pre-determined aging time(s) associated with the entries (e.g., a typical aging time is of the order of 5 minutes). While both of these ways of removing MAC entries from the failed link FDB 108 can work, the relative choice of which way to adopt may be based upon implementer-based parameters, such as restoration time for protection-to-normal switching. As is evident from the above mechanism, protection switching requires only updating of the selector for selecting the FDB (108 or 114). Since this depends only on the number of protection domains, which are generally very few in number, and not on the number of MACs (e.g., MAC entries), the operation takes a fixed time and can be performed by the processor 104 in a sub-50 ms time frame.

Figure 3:
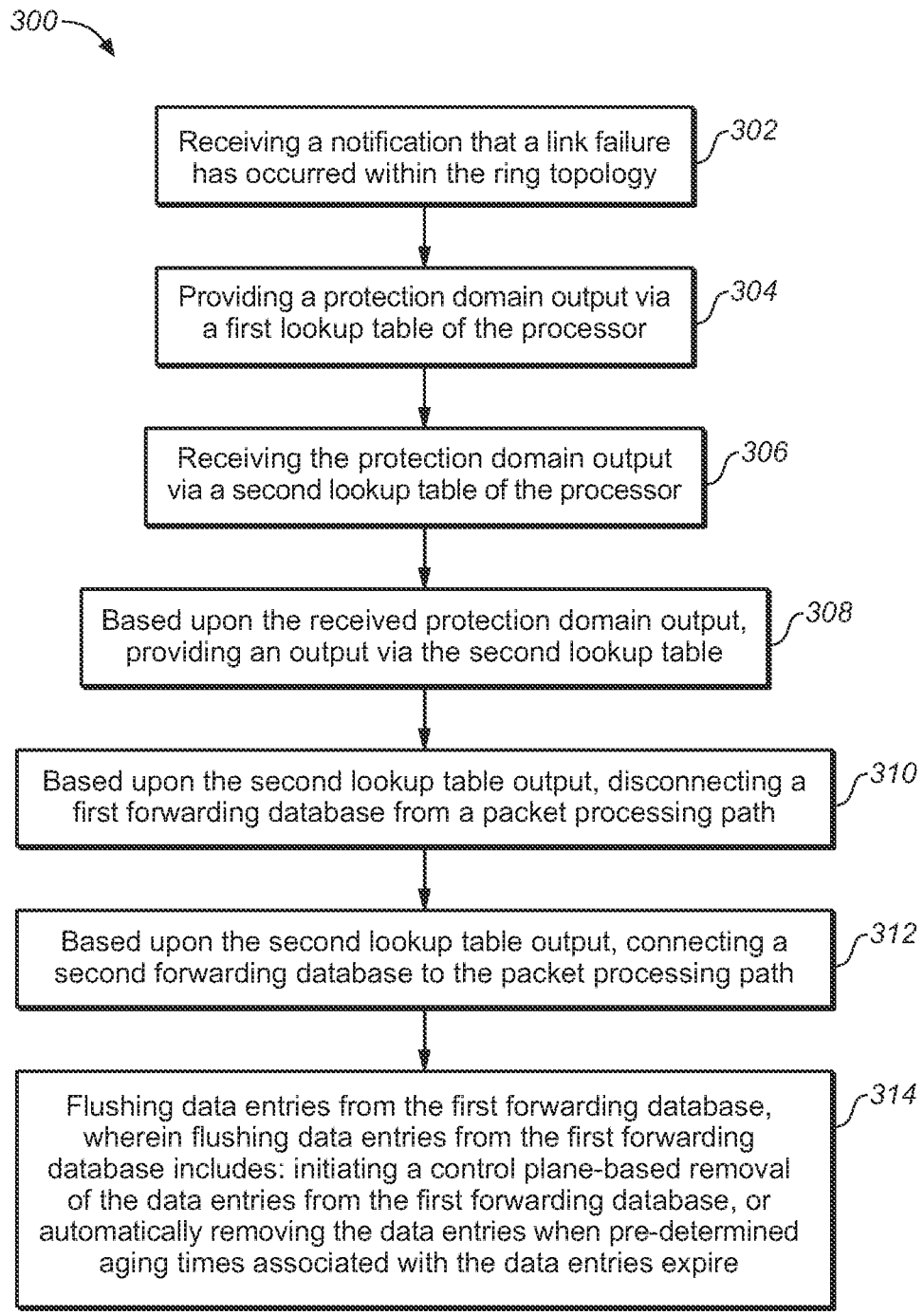
FIG. 3 is a flow chart illustrating a method for providing protection switching via a processor of a node included in a plurality of nodes configured in a ring topology in accordance with an exemplary embodiment of the present disclosure.

FIG. 3 is a flowchart illustrating a method for providing protection switching via a processor of a node included in the plurality of nodes, the plurality of nodes being configured in a ring topology. In embodiments, the method 300 includes the step of receiving a notification (e.g., signal) that a link failure has occurred within the ring topology 302. For example, the processor 104 is configured for receiving a notification that a link failure has occurred with the ring topology 100. In embodiments, the method 300 further includes the step of providing a protection domain output via a first lookup table of the processor 304. In embodiments, the method 300 further includes the step of receiving the protection domain output via a second lookup table of the processor 306. In embodiments, the method 300 further includes the step of, based upon the received protection domain output, providing an output via the second lookup table 308. In embodiments, the method 300 further includes the step of, based upon the second lookup table output, disconnecting a first forwarding database from a packet processing path 310. In embodiments, the method 300 further includes the step of, based upon the second lookup table output, connecting a second forwarding database to the packet processing path 312. In embodiments, the method 300 further includes the step of flushing data entries from the first forwarding database 314. In some embodiments, the step of flushing data entries from the first forwarding database includes initiating a control plane-based removal of the data entries from the first forwarding database. In other embodiments, the step of flushing data entries from the first forwarding database includes automatically removing the data entries when pre-determined aging times associated with the data entries expire.

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing protection switching via a processor of a node included in a plurality of nodes configured in a ring topology, the method comprising:
receiving a notification that a link failure has occurred within the ring topology;
providing a protection domain output via a first lookup table of the processor in response to receiving the notification that the link failure has occurred;
receiving the protection domain output via a second lookup table of the processor;
based upon the received protection domain output, generating a selector output via the second lookup table; and
based upon the second lookup table selector output, disconnecting a first forwarding database from a packet processing path.

2. The method as claimed in claim 1, further comprising:
based upon the second lookup table selector output, connecting a second forwarding database to the packet processing path.

3. The method as claimed in claim 2, further comprising:
flushing data entries from the first forwarding database.

4. The method as claimed in claim 3, wherein flushing data entries from the first forwarding database includes:
initiating a control plane-based removal of the data entries from the first forwarding database.

5. The method as claimed in claim 3, wherein flushing data entries from the first forwarding database includes:
automatically removing the data entries when pre-determined aging times associated with the data entries expire.

6. The method as claimed in claim 3, wherein the data entries are Media Access Control data entries.

7. The method as claimed in claim 1, wherein the first lookup table is a Virtual Local Area Network-level lookup table.

8. A non-transitory computer-readable medium having computer-executable instructions for performing a method for providing protection switching via a processor of a node included in a plurality of nodes configured in a ring topology, the method comprising:
receiving a notification that a link failure has occurred within the ring topology;
providing a protection domain output via a first lookup table of the processor in response to receiving the notification that the link failure has occurred;
receiving the protection domain output via a second lookup table of the processor;
based upon the received protection domain output, generating a selector output via the second lookup table; and
based upon the second lookup table selector output, disconnecting a first forwarding database from a packet processing path.

9. The non-transitory computer-readable medium as claimed in claim 8, the method further comprising:
based upon the second lookup table selector output, connecting a second forwarding database to the packet processing path.

10. The non-transitory computer-readable medium as claimed in claim 9, the method further comprising:
flushing data entries from the first forwarding database.

11. The non-transitory computer-readable medium as claimed in claim 10, wherein flushing data entries from the first forwarding database includes:
initiating a control plane-based removal of the data entries from the first forwarding database.

12. The non-transitory computer-readable medium as claimed in claim 10, wherein flushing data entries from the first forwarding database includes:
automatically removing the data entries when pre-determined aging times associated with the data entries expire.

13. The non-transitory computer-readable medium as claimed in claim 10, wherein the data entries are Media Access Control data entries.

14. The non-transitory computer-readable medium as claimed in claim 8, wherein the first lookup table is a Virtual Local Area Network-level lookup table.

15. A network processor for implementation within a node of a ring topology and for providing protection switching, the network processor comprising:
a memory;
a first forwarding database and a second forwarding database, the first and second forwarding databases being stored in the memory;
a first lookup table and a second lookup table, the first and second lookup tables being stored in the memory; and
control programming for performing the following steps:
receiving a notification that a link failure has occurred within the ring topology; providing a protection domain output via the first lookup table in response to receiving the notification that the link failure has occurred; receiving the protection domain output via the second lookup table; based upon the received protection domain output, generating a selector output via the second lookup table; based upon the second lookup table output, disconnecting the first forwarding database from a packet processing path; based upon the second lookup table output, connecting the second forwarding database to the packet processing path; and flushing data entries from the first forwarding database, wherein flushing data entries from the first forwarding database includes: initiating a control plane-based removal of the data entries from the first forwarding database, or automatically removing the data entries when pre-determined aging times associated with the data entries expire.

16. The network processor as claimed in claim 15, wherein the data entries are Media Access Control data entries.

17. The network processor as claimed in claim 15, wherein the first lookup table is a Virtual Local Area Network-level lookup table.

18. The network processor as claimed in claim 15, wherein the ring topology is an Ethernet ring topology and protection switching being provided is Ethernet Ring Protection Switching.

* * * * *